United States Patent
Chuah et al.

(10) Patent No.: US 6,693,952 B1
(45) Date of Patent: Feb. 17, 2004

(54) DYNAMIC CODE ALLOCATION FOR DOWNLINK SHARED CHANNELS

(75) Inventors: Mooi Choo Chuah, Eatontown, NJ (US); On-Ching Yue, Middletown, NJ (US); Qinqing Zhang, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/268,799

(22) Filed: Mar. 16, 1999

(51) Int. Cl.[7] .......................... H04B 1/69; H04B 7/216; H04L 23/00
(52) U.S. Cl. .................. 375/140; 375/146; 375/147; 375/377; 370/335
(58) Field of Search ............................. 375/130, 140, 375/141, 146, 377, 147; 370/203, 208, 342, 335, 329

(56) References Cited

U.S. PATENT DOCUMENTS

| 6,091,757 A | * | 7/2000 | Cudak et al. | |
| 6,108,369 A | * | 8/2000 | Ovesjo et al. | 375/146 |
| 6,163,524 A | * | 12/2000 | Magnusson et al. | 37/342 |
| 6,233,231 B1 | * | 5/2001 | Felix et al. | 375/130 |
| 2002/0018457 A1 | * | 2/2002 | Choi et al. | |
| 2002/0051437 A1 | * | 5/2002 | Take | |

FOREIGN PATENT DOCUMENTS

WO    WO-00/49816    * 8/2000

OTHER PUBLICATIONS

Adach et al., "Tre-structured generation of orthogonal spreading codes with different lengths for forward link of DS-CDMA mob radio," Electronic letter, $2^{nd}$ Jan. 1997, vol. 33, No. 1, 27-28.*

Minn et al., "Dynamic Assignment of Orthogonal Variable-–Spreading Factor does in W-CDMA," IEEE, 2000, pp 1429-1440.*

Shueh, "Code Assignment for IMT-2000 on Forward Radio Link,"IEEE, 2000, pp906-910.*

Tseng et al., "Code Palcment and Replacment Strategies for Wideband CDMA OVSF Code-Tree," IEEE, 9/01 2001, pp 562-566.*

* cited by examiner

Primary Examiner—Tesfaldet Bocure

(57) ABSTRACT

In a Universal Mobile Telecommunications System (UMTS) based wireless system, a channelization code-tree is partitioned into two sets: a permanent set and shared a shared set. Those codes in the permanent set are assigned to low data rate users for the duration of a session, or connection. Those codes in the shared set are assigned to high data rate users on a frame-by-frame basis using a downlink shared (DSCH) channel. The partition boundary between the permanent set and the shared set can be dynamically shifted based on traffic conditions.

24 Claims, 7 Drawing Sheets

DYNAMIC CODE ALLOCATION FOR DOWNLINK SHARED CHANNELS

FIELD OF THE INVENTION

This invention relates generally to communications and, more particularly, to wireless communications systems.

BACKGROUND OF THE INVENTION

With the urge to provide multimedia capabilities in mobile communications, there is an increasing need for providing higher bandwidth in a wireless access network. Thus, multi-rate and variable rate services are considered very important features in future wireless systems such as the Universal Mobile Telecommunications System (UMTS) (e.g., see E. Dahlman et al, "*UMTS/IMT* 2000 *Based On Wideband CDMA*," IEEE Communications Magazine, September 1998, pp 70–80). In proposed UMTS-based Terrestrial Radio Access (UTRA) FDD (frequency division duplex) systems, different data rates are achieved by using, what is known in the art as, channelization codes with different spreading factors. (As used herein, the term "data rate" applies to any multi-media application that requires packet transport, e.g., a voice packet is transmitted with a particular data rate.)

Channelization codes in UMTS are Orthogonal Variable Spreading Factor (OVSF) codes that preserve the orthogonality between downlink channels of different data rates and spreading factors within a cell. (As known in the art, in wireless communications a geographical region is divided into cells (typically of a hexagonal pattern).) The OVSF codes (hereafter simply referred to as codes) are defined using a code-tree, a portion of which is shown in FIG. 1. As shown in FIG. 1, a particular code is represented as $C_{i,j}$, where the subscript i,j, identifies the length spreading factor (SF) and the number of the code, respectively. For example, $C_{2,1}$ is the first code with a length SF of 2. As such, it can be observed that each level of the code-tree defines a number of codes having a particular length SF. In the context of FIG. 1, for an illustrative chip rate of 4.096 Mcps (millions of chips per second), a mobile data user (user) requiring a data rate of 512 Kbps (thousands of bits per second) will use a code with a spreading factor of 8 (either one of $C_{8,1}$ through $C_{8,8}$) while a 64 Kbps user uses a code (further down the tree) with a spreading factor of 64 (either one of $C_{64,1}$ through $C_{64,64}$) (not shown).

Unfortunately, all codes within the code-tree cannot be used simultaneously within a cell. In particular, a code can be used in a cell if and only if no other code on the path from the specific code to the root of the tree or in the sub-tree below the specific code is used in the same cell. For example, with reference to FIG. 1, if the code $C_{4,3}$ is used, then the codes $C_{1,1}$, $C_{2,2}$, and all codes corresponding to the children of the node representing the code, $C_{4,3}$, cannot be used. Thus, the number of available codes depends on how the codes are assigned to each user.

The downlink shared channel (DSCH) concept (e.g., see Tdoc SMG2 UMTS-L1 311/98, "*UTRA FDD Downlink Packet Data Operation with Shared Channels*", Nokia) is an attempt to remedy this potential code shortage problem. In DSCH, all codes are shareable, or multiplexed, between users on a frame by frame basis, thus achieving the highest possible multiplexing gain.

In particular, DSCH is a type of transport channel shared by a number of users for data rate transmissions in which the generated traffic is usually bursty and delay insensitive (such as results from web browsing). As such, DSCH only carries data traffic from high-rate users. A user is assigned a temporary code for the DSCH. The assigned code is on a frame-by-frame basis. A user therefore uses the assigned code for at least a full 10 ms (milli-second) frame. Each user who will share the DSCH is assigned a dedicated downlink traffic channel. (This dedicated traffic channel carries Layer 1 information such as pilot, power control bits (TPC) and transport-format combination indicator (TFCI) bits. This channel can also carry higher layer (Layer 2/3) signaling.)

SUMMARY OF THE INVENTION

However, we have observed that the above-described code sharing method generates additional Layer 1, 2, and 3 signaling since the code assignments may need to be reshuffled to admit new users. For example, as noted above, the code assigned to a low data rate user eliminates possible assignments of any code on the path back to the root of the code-tree (these are codes with lower length SFs than the assigned code). As such, in order to free up a code (with a lower length SF) for use by a high data rate user, a low rate user may have to be reassigned another code.

Therefore, and in accordance with the invention, a code-tree is partitioned into two parts, or sets: a permanent set and a shared set.

In an embodiment of the invention, a code-tree is partitioned into two sets: a permanent set and a shared set. Those codes in the permanent set are assigned to a user for the duration of a session, or connection. Those codes in the shared set are assigned to users on a frame-by-frame basis using the above-mentioned DSCH channel. Typically, users with low data rate requests (e.g., voice) are assigned codes from the permanent set, and users with high data rate requests are assigned codes from the shared set.

In another embodiment of the invention, the partition boundary between the permanent set and the shared set is dynamically shifted based on traffic conditions.

DETAILED DESCRIPTION

Figure 1:
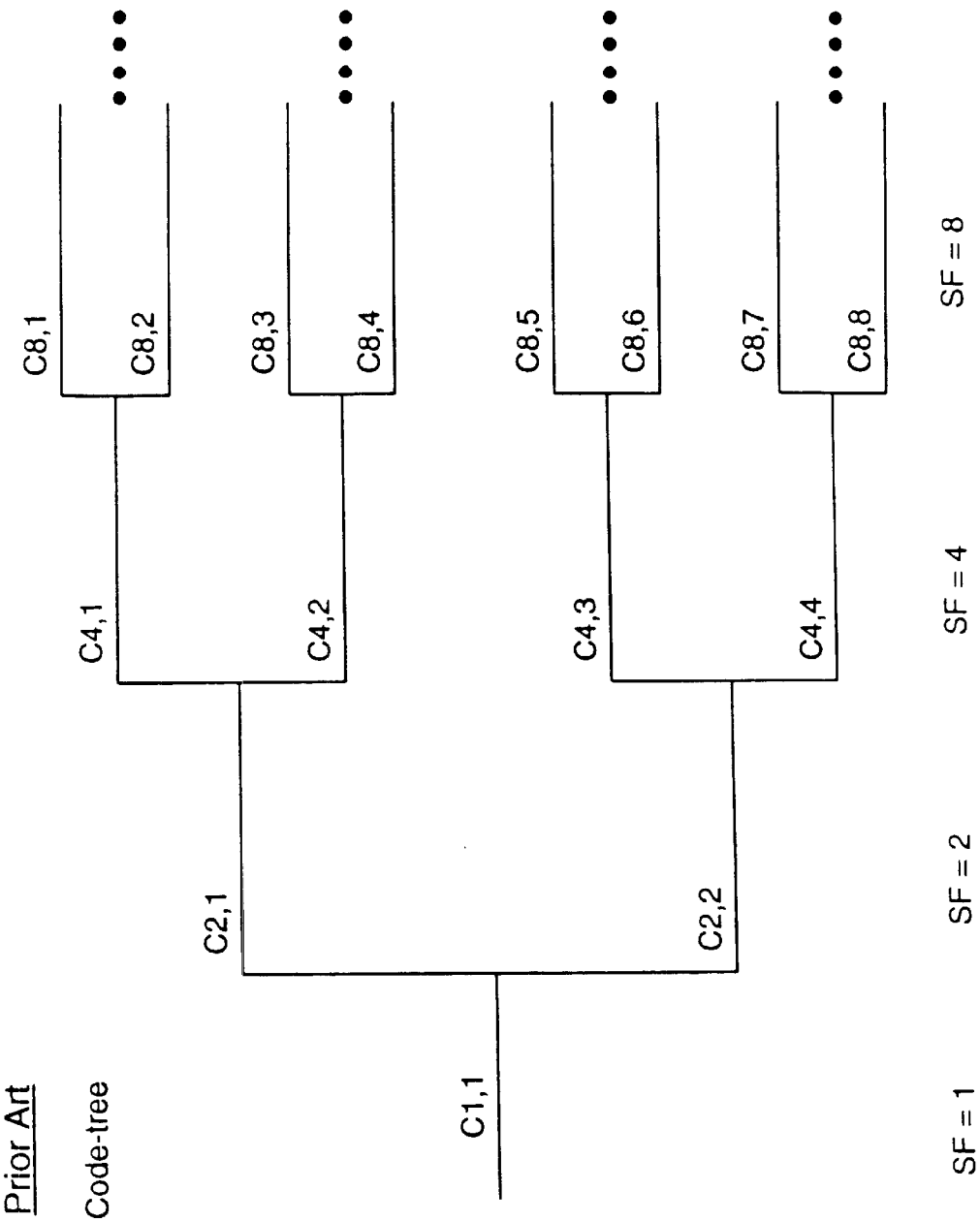
FIG. 1 shows a portion of a prior art code-tree.
Figure 2:
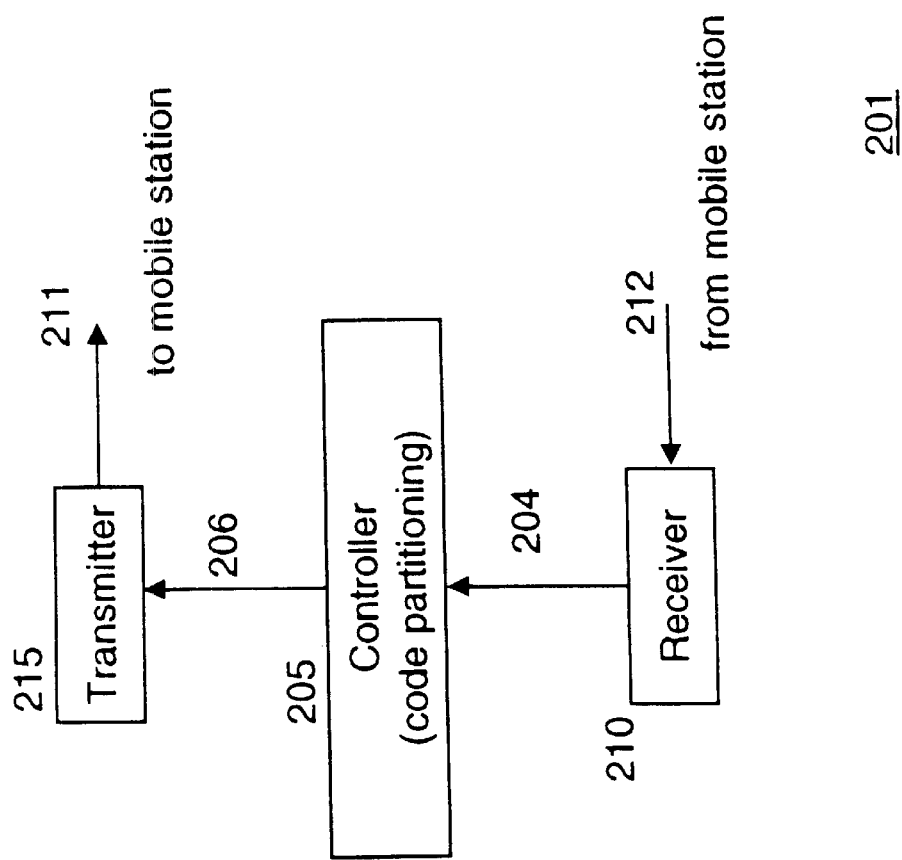
FIG. 2 shows a portion of a wireless endpoint embodying the principles of the invention.

In accordance with the inventive concept, a wireless endpoint, e.g., a base station, partitions a code-tree into a permanent set and a shared set. FIG. 2 shows a portion of a base station 201 embodying the principles of the invention. Except as noted below, it is assumed that base station 201 conforms to currently proposed UMTS standards, e.g., as cited above. Other than the inventive concept, the elements shown in FIG. 2 are well-known and will not be described in detail. For example, controller 205 is representative of a stored-program-controlled processor with associated memory as known in the art. Also, only that portion of base station 201 related to the inventive concept is shown, e.g., other processing by receiver 210 of the received signal is not described. Base station 201 comprises controller 205 (also referred to herein as the base station processor), receiver 210, and transmitter 215. Receiver 210 receives an uplink signal, 212, from a mobile station (not shown) and provides information from the uplink signal to controller 205 via signal(s) 204. Controller 205 provides downlink information via signal(s) 206 to transmitter 215 for transmission to the mobile station (not shown) via downlink signal 211.

Figure 3:
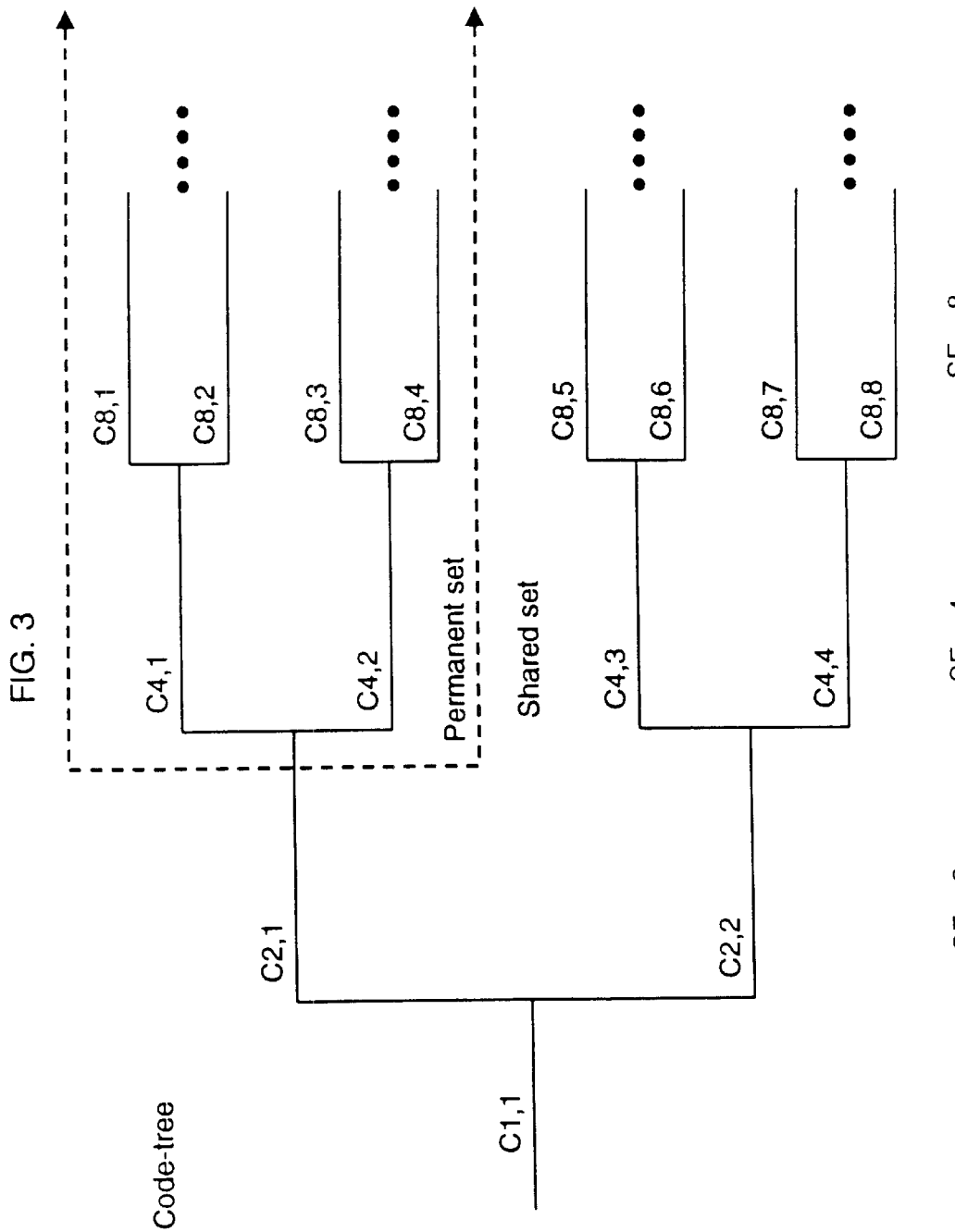
FIG. 3 shows a portion of a code-tree in accordance with the principles of the invention.

As noted above, each base station uses codes from a code-tree to preserve the orthogonality between downlink channels of different data rates and spreading factors within a cell. (The code-tree is assumed to be stored within the above-mentioned memory (not shown) of controller 205). In accordance with the invention, base station 201 partitions the code-tree into two sets: a permanent set and a shared set. This code partitioning is illustrated in FIG. 3, which shows a portion of a code-tree. As can be seen in FIG. 3, the permanent set comprises all codes in the subtree below the code C2,1, e.g., C4,1, C4,2, C8,1, C8,2, C8,3, C8,4, etc. All other codes are in the shared set, e.g., C2,2. C4,3, C8,5, etc.

Figure 4:
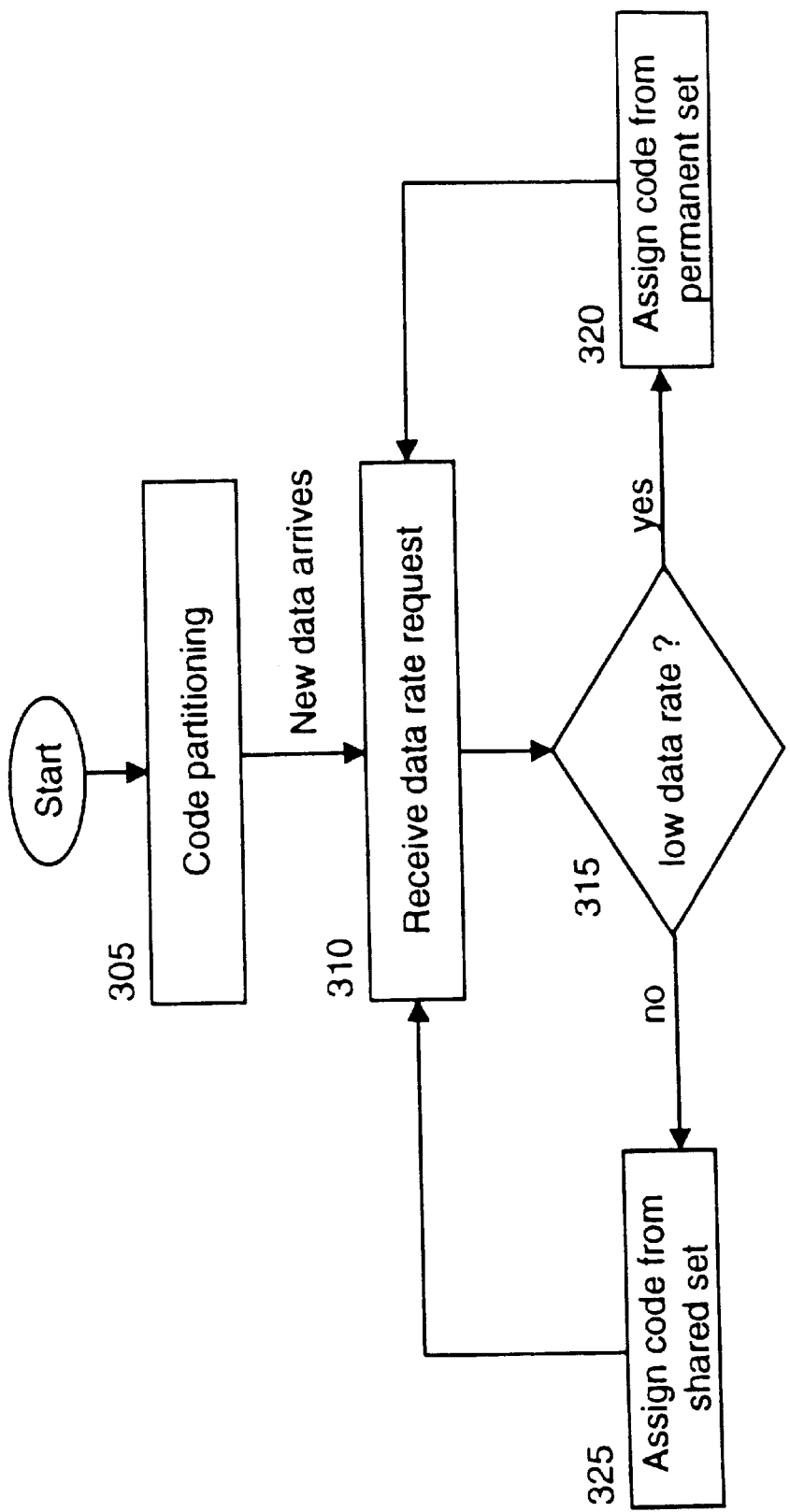
FIG. 4 is a flow chart of an illustrative method in accordance with the principles of the invention.

Reference now should also be made to FIG. 4, which shows a flow chart of an illustrative method in accordance with the principles of the invention. It is presumed that the base station processor is suitably programmed to carry out the below-described method using conventional programming techniques, which, as such, will not be described herein. In step 305, the base station processor partitions the code into a permanent set and a shared set. This code partitioning can either be performed a priori or dynamically (described further below).

In step 310, the base station processor receives a data request from a mobile station (not shown) via the above-mentioned uplink channel, e.g., 212. In step 315, the base station processor determines if the data rate request is a low data rate request or not (e.g., alternatively a high data rate request). (As observer earlier, a data rate request includes, e.g., a request for transmission of voice.) Illustratively, a low data rate request is defined as less than or equal to 32 Kbps. If it is a low data rate request, a code from the permanent set is assigned to the user for the duration of the session, or connection, in step 320. If it is not a low data rate request, a code from the shared set is assigned in step 325. Those codes in the shared set are assigned to users on a frame-by-frame basis using the above-mentioned DSCH channel. After the assignment of the code in either step 320 or step 325, the base station processor returns to step 310 for processing additional data requests. (For simplicity, the following steps were not shown in the flow chart of FIG. 4. If no more codes are available for assignment in either step 320 or step 325, the user's request is denied. In this instance, it is up to the user to resubmit the request. Alternatively, the user's request is queued, or buffered, for reconsideration at the next decision point, e.g., the next frame. In this case, the user's request is not initially denied, but simply delayed. Also, once either the session, or connection, is terminated (in the case of a permanently assigned code) or the number of frames allocated to the mobile station (not shown) for use of the assigned shared code have been sent, the codes are released for reassignment.)

For example, when a request for 8 Kbps (voice service, denoted as Request 1) arrives, the base station processor assigns a code with a spreading factor of 512 (corresponding to 8 Kbps) from the permanent set (not shown in FIG. 3). When a request for 64 Kbps arrives (denoted as Request 2), the base station processor assigns a code with a spreading factor of 64 from the shared set (not shown in FIG. 3). This code from the shared set is allocated on a frame-by-frame basis in accordance with the above-mentioned DSCH channel. Illustratively, assume that code C64,33 is available for assignment from the shared set and is assigned by the base station processor to Request 2 for the duration of four frames. This means that C2,2, C4,3, C8,5, C16,9, C32,17 and all codes below the subtree of C64,33 are not available for other users, i.e., they are blocked codes. Once the request is satisfied, code C64,33 is released and is available for re-assignment (and this will also release the above-mentioned blocked codes for subsequent assignment).

It should also be noted that codes from the permanent set are shared between providing a DCH (data channel) for low data rate users as well as signaling channels for DSCH users. For example, the base station processor assigns a code with a spreading factor of 512 from the permanent set for signaling purposes with the mobile stations (not shown).

Figure 5:
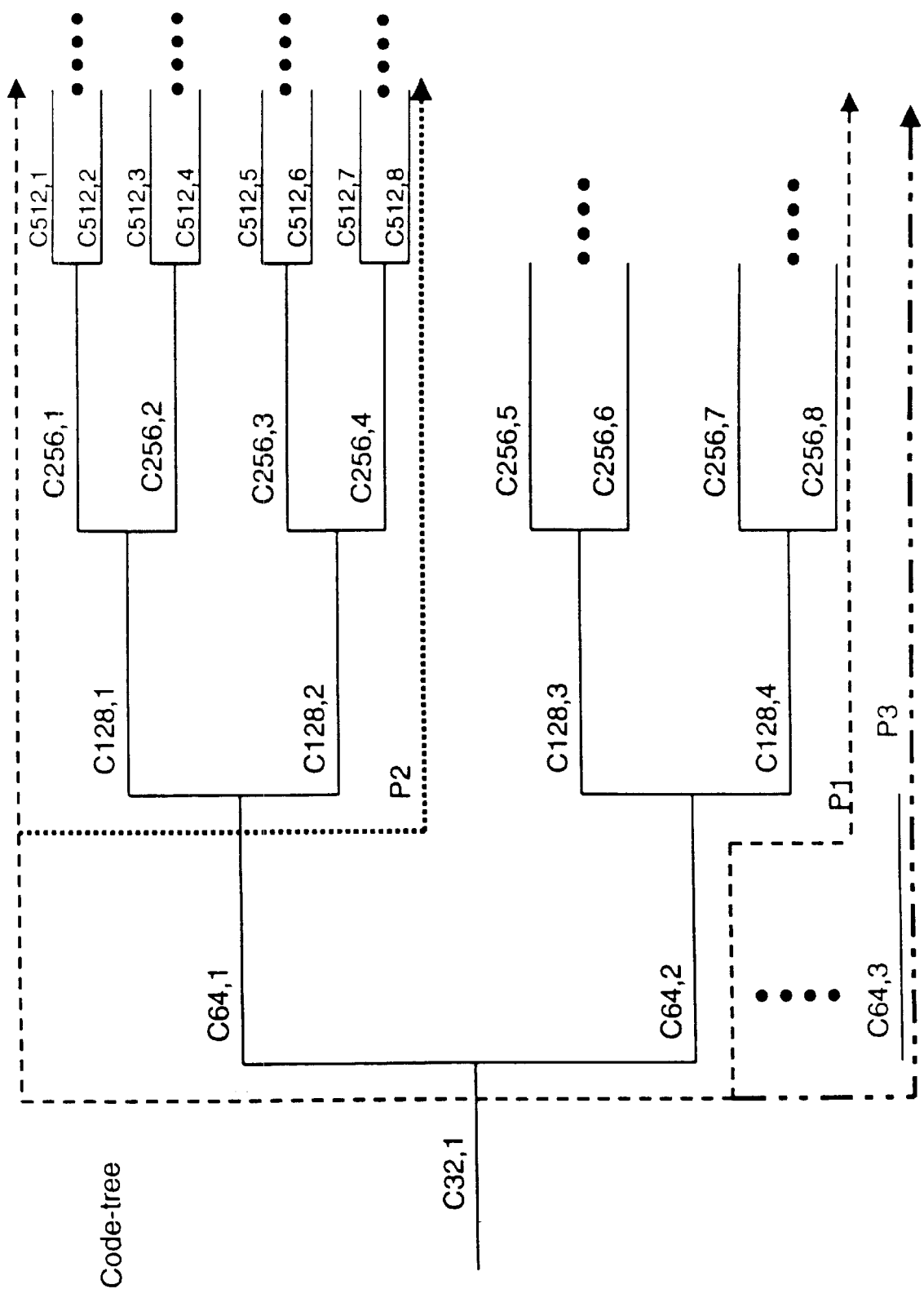
FIG. 5 illustrates dynamic partitioning of a code-tree.

As noted above, the code partitioning can be performed dynamically. For example, the partition boundary between the permanent set and the shared set can be dynamically shifted, or moved, based on traffic conditions. This is illustrated in FIG. 5. As shown in FIG. 5 a code-tree is initially partitioned so that the permanent set corresponds to set P1, which comprises all codes in the subtree below the code C32,1, e.g., C64,1, C64,2, C8,1, C128,1, C128,2, C128,3, etc. All other codes are in the shared set, e.g., C64,3, etc. For this example, a low data rate is defined as less than or equal to 32 Kbps. (That is, users requesting data rates of 32 Kbps are assigned codes from the permanent set, P1.) Any users requesting higher data rates are assigned codes from the shared set. In this context, the above-described method of FIG. 4 is used except as modified by the methods shown in FIGS. 6 and 7 for dynamically partitioning the code-tree (described below). New users assigned codes from the permanent set are assigned codes as adjacent as possible. For example, first code C512,1 is assigned, then code C512, 2, then code C512, 3, etc.

Figure 6:
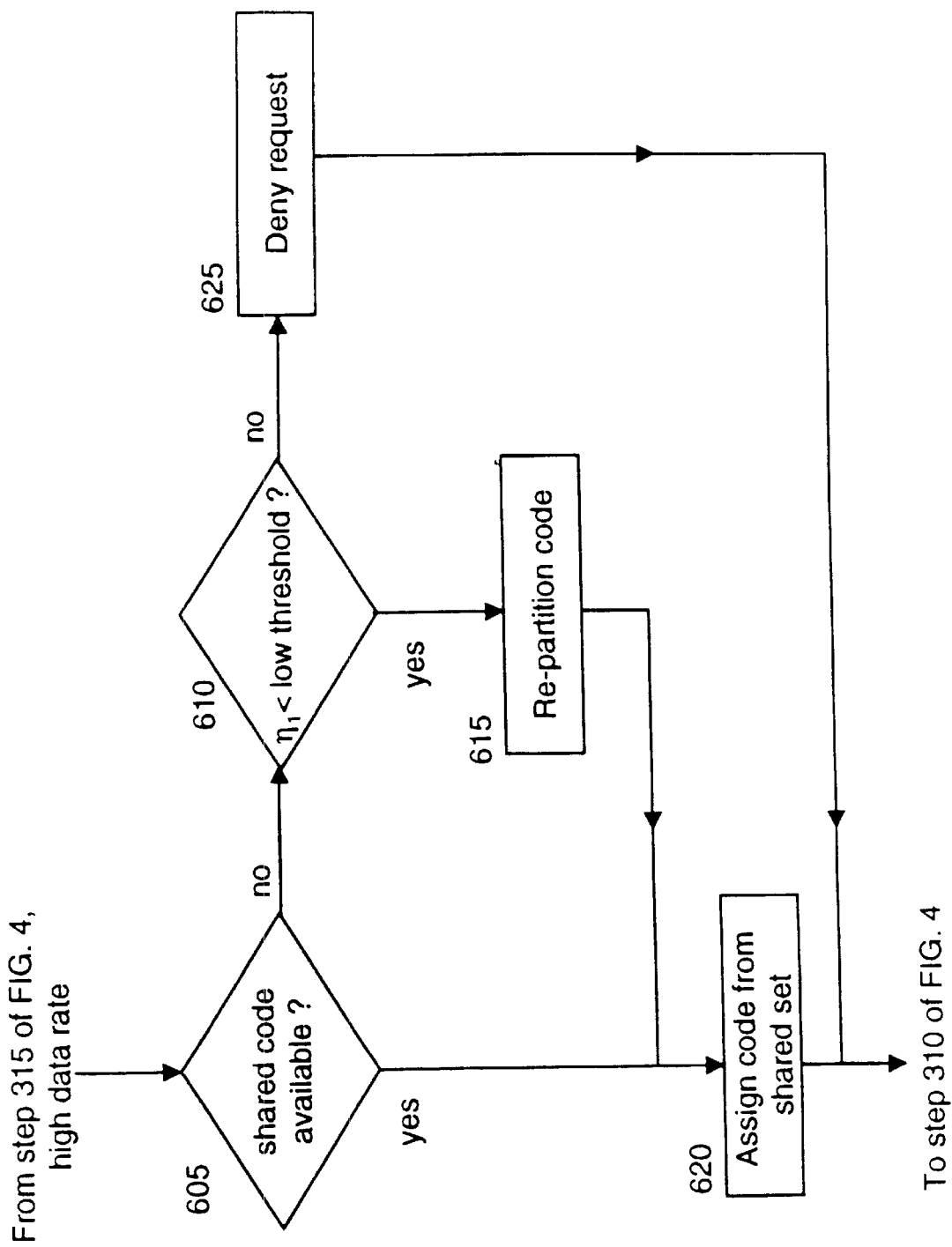
FIGS. 6 and 7 are flow charts of illustrative methods for dynamically partitioning a code-tree.

At this point, reference should be made to FIG. 6, which shows a flow chart for an illustrative threshold-based method for changing the boundary between the permanent set and the shared set. From the original partition, P1, it can be observed that it is possible to accommodate 16 "low data rate" users at 8 Kbps each (e.g., C512, 1 through C512, 8, and C512,9 through C512,16 (this latter group is not shown in FIG. 5 but extends from C256, 5 through C256,8). Let a variable, $\eta_1$, be defined as representing the utilization percentage of the permanent set determined in the context of admitted 8 Kbps users. That is, $$\eta_1 = \frac{\text{number of admitted 8 Kbps users}}{\text{maximum number of 8 Kbps users}} \times 100.$$

As noted, in this example, the maximum number of 8 Kbps users is 16. For every low data rate user admitted to the system, the equivalent number of 8 Kbps users is determined and the value of $\eta_1$ is updated to reflect the new utilization value. For example, if a new user requesting 16 Kbps arrives and is admitted to the system, this user's equivalent 8 Kbps utilization is equal to (16 Kbps/8 Kbps)=2. As such, the number of admitted 8 Kbps users is increased by 2 and the utilization percentage of the permanent set, $\eta_1$, is updated to reflect the new utilization value.

After the base station processor determines that a high data rate user is requesting access (e.g., see step 315 of FIG. 4), a check is made in step 605 to determine if a shared code is available for assignment. If a shared code is available for assignment, the shared code is assigned in step 620 and execution returns to step 310 of FIG. 4. However, if no shared code is available, the current value of $\eta_1$ is compared to a predetermined low threshold, e.g., 40% in step 610. If $\eta_1$<low threshold, the partition boundary is changed in step 615, and as illustrated in FIG. 5 by reducing the permanent partition from P1 to P2. This re-partitioning makes code C64,2 available for the requesting high data rate user. (As noted above, if the permanent set codes are assigned, e.g., sequentially and adjacency is maintained, a utilization percentage of 40% ensures the assigned codes are limited to the paths ending in C512,1 through C512,8.) In step 620, a code is assigned from the new shared set and execution returns to step 310 of FIG. 4. On the other hand, if $\eta_1 \geq$ low threshold, in step 610, then the requesting high data rate user is not admitted in step 625 and execution returns to step 310 of FIG. 4.

Figure 7:
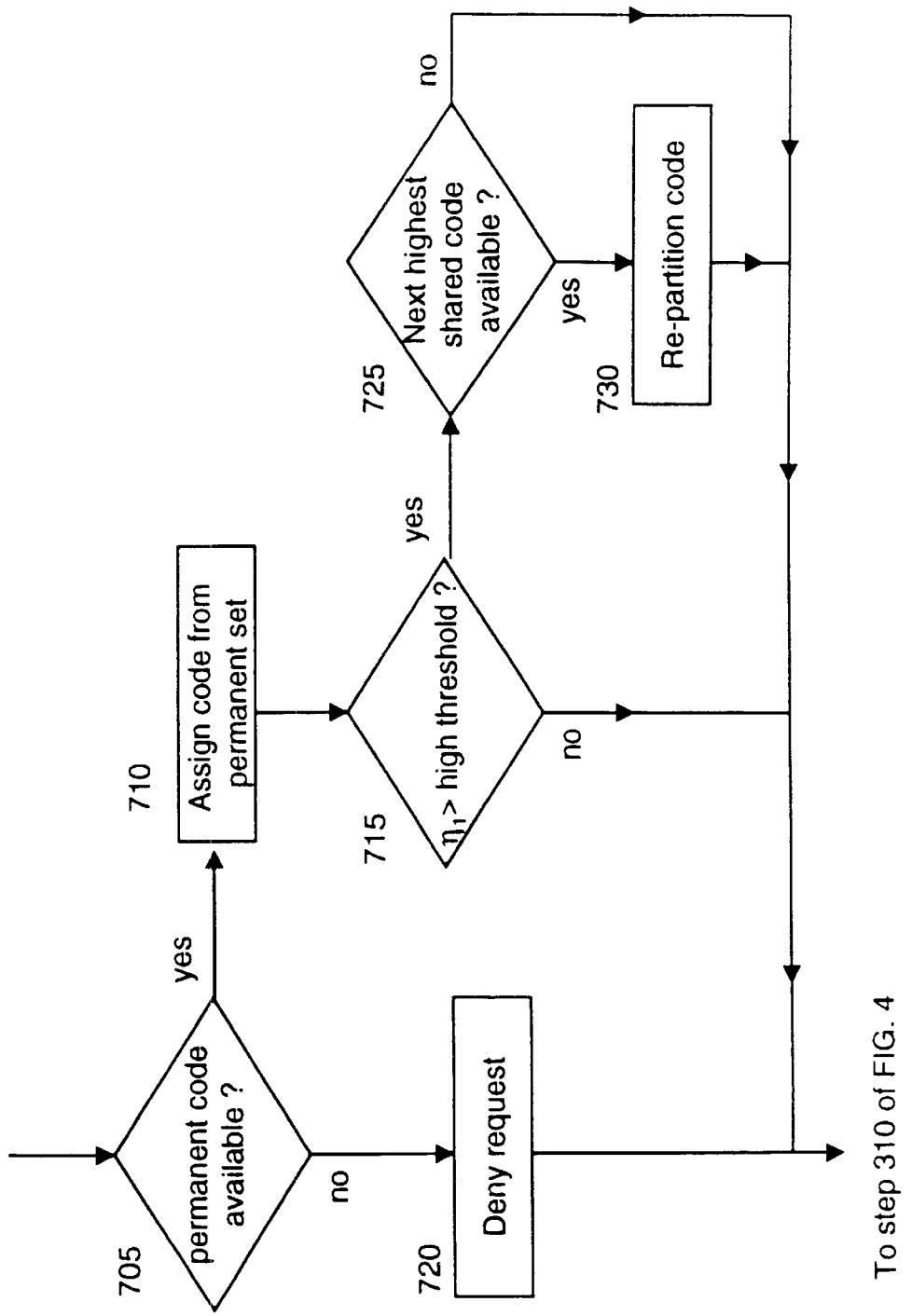

Conversely, a method for use in enlarging the permanent set is shown in FIG. 7. After the base station processor determines that a low data rate user is requesting access (e.g., see step 315 of FIG. 4), a check is made in step 705 to determine if a permanent code is available for assignment. If a permanent code is not available for assignment, the request is denied in step 720 and execution returns to step 310 of FIG. 4. However, if a permanent code is available for assignment, the permanent code is assigned in step 710. At this point, the value of ill is adjusted and the adjusted value is compared to a predetermined high threshold, e.g., 75% in step 715. If $\eta_1 \leq$ high threshold, then execution returns to step 310 of FIG. 4. However, if $\eta_1$>high threshold, a check is made in step 725 if the next highest shared code is available, i.e., not blocked. If the next highest shared code is blocked, execution returns to step 310 of FIG. 4. If the next highest shared code is not blocked, the partition boundary is changed in step 730, and as illustrated in FIG. 5 by enlarging the permanent partition from P1 to P3. In the context of FIG. 5, this makes additional codes under C64,3 available for low data rate users. In this example, once the number of available permanent codes exceeds a threshold and if adjacent shared codes are not blocked, the permanent set is expanded (at the expense of the shared set) to accommodate more low data rate users.

Other modifications to the notion of dynamic partitioning may be made. For example, an equivalent utilization factor for the shared set can be defined and a method similar to that shown in FIG. 6 used for enlarging the permanent set when the shared set has an efficiency lower than a threshold value. (Again, it would be assumed that code assignments in the shared set would be as adjacent as possible but from the opposite end of the tree, e.g., referring briefly to the partition illustrated in FIG. 3, the shared code assignments would start from, e.g., C4,4.) Similarly, the base station can periodically monitor the efficiencies of either the shared set and/or the permanent set and, when the respective efficiencies are less than a threshold (predefined or changed in real time) re-partition the code-tree.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was illustrated herein as being implemented with discrete functional building blocks, e.g., a controller, etc., the functions of any one or more of those building blocks can be carried out using one or more appropriately programmed processors, e.g., a digital signal processor; discrete circuit elements; integrated circuits; etc. Further, although illustrated in the context of UMTS, the inventive concept is applicable to any wireless system or application that requires allocation of codes. Similarly, although the invention was illustrated in the context of base station, the invention is applicable to any wireless endpoint, e.g., a mobile station.

What is claimed:

1. A method for use in a wireless endpoint, the method comprising the steps of:

partitioning a code-tree into a permanent set and a shared set;

communicating with another wireless endpoint by first selecting either the permanent set or the shared set and then selecting a code, from the selected set, for use in transporting data to the other wireless endpoint; and re-partitioning the code-tree as a function of traffic.

2. The method of claim 1 wherein the code tree represents a number of channelization codes.

3. The method of claim 2 wherein the channelization codes are orthogonal variable spreading factor codes.

4. The method of claim 1 wherein the communicating step includes the steps of:

selecting the permanent set when the other wireless endpoint requests a data rate below a threshold; and selecting the shared set otherwise.

5. The method of claim 1 wherein a code selected from the shared set is assigned on a frame-by-frame basis to the other wireless endpoint, while a code selected from the permanent set is assigned to the other wireless endpoint for the duration of a data session with the other wireless endpoint.

6. A method for use in a wireless endpoint, the method comprising the steps of:

receiving a data request, from another wireless endpoint, for a data session, the data request having an associated data rate;

selecting either a shared set of codes or a permanent set of codes as a function of the associated data rate; and selecting a code from the selected set for use by the other wireless endpoint, wherein, if the code is selected from the permanent set, the code is assigned to the other wireless endpoint for the duration of the data session, and if the code is selected from the shared set, the code is assigned to the other wireless endpoint for a period of time less than the duration of the data session, said selecting a code step including the step of re-partitioning the code-tree as a function of traffic.

7. The method of claim 6 wherein the code tree represents a number of channelization codes.

8. The method of claim 7 wherein the channelization codes are orthogonal variable spreading factor codes.

9. The method of claim 6 wherein a code selected from the shared set is assigned on the frame-by-frame basis using a downlink shared channel (DSCH).

10. The method of claim 6, wherein the step of selecting either the shared set or the permanent set includes the steps of:

selecting the permanent set if the associated data rate is less than a threshold; and selecting the shared set otherwise.

11. A method for use in a wireless endpoint, the method comprising the steps of:

receiving a data request, from another wireless endpoint, for a data session, the data request having an associated data rate;

selecting either a shared set of codes or a permanent set of codes as a function of the associated data rate, wherein if the shared set is selected, determining if a shared code is available for assignment;

if a shared code is not available for assignment, re-partitioning the code-tree if a utilization factor of the permanent set is less than a utilization threshold value, wherein the re-partitioning results in increasing the size of the shared set; and selecting a code from the selected set for use by the other wireless endpoint, wherein, if the code is selected from the permanent set, the code is assigned to the other wireless endpoint for the duration of the data session, and if the code is selected from the shared set, the code is assigned to the other wireless endpoint for a period of time less than the duration of the data session.

12. A method for use in a wireless endpoint, the method comprising the steps of:

receiving a data request, from another wireless endpoint, for a data session, the data request having an associated data rate;

selecting either a shared set of codes or a permanent set of codes as a function of the associated data rate, wherein if the permanent set is selected, determining if a permanent code is available for assignment;

if a permanent code is not available for assignment, re-partitioning the code-tree if a utilization factor of the shared set is less than a utilization threshold value, wherein the re-partitioning results in increasing the size of the permanent set; and selecting a code from the selected set for use by the other wireless endpoint, wherein, if the code is selected from the permanent set, the code is assigned to the other wireless endpoint for the duration of the data session, and if the code is selected from the shared set, the code is assigned to the other wireless endpoint for a period of time less than the duration of the data session.

13. A method for use in a wireless endpoint, the method comprising the steps of:

receiving a data request, from another wireless endpoint, for a data session, the data request having an associated data rate;

selecting either a shared set of codes or a permanent set of codes as a function of the associated data rate, wherein if the permanent set is selected, determining a utilization factor of the permanent set;

if the utilization factor is greater than a threshold, re-partitioning the code-tree to increase the size of the permanent set; and selecting a code from the selected set for use by the other wireless endpoint, wherein, if the code is selected from the permanent set, the code is assigned to the other wireless endpoint for the duration of the data session, and if the code is selected from the shared set, the code is assigned to the other wireless endpoint for a period of time less than the duration of the data session.

14. The method of claim 13 wherein the determining step includes the step of determining the utilization factor subsequent to the assignment of a permanent code to the other wireless endpoint.

15. A method for use in a wireless endpoint, the method comprising the steps of:

receiving a data request, from another wireless endpoint, for a data session, the data request having an associated data rate;

selecting either a shared set of codes or a permanent set of codes as a function of the associated data rate wherein if the shared set is selected, determining a utilization factor of the shared set;

if the utilization factor is greater than a threshold, re-partitioning the code-tree to increase the size of the shared set; and selecting a code from the selected set for use by the other wireless endpoint, wherein, if the code is selected from the permanent set, the code is assigned to the other wireless endpoint for the duration of the data session, and if the code is selected from the shared set, the code is assigned to the other wireless endpoint for a period of time less than the duration of the data session.

16. The method of claim 15 wherein determining step includes the step of determining the utilization factor subsequent to the assignment of a shared code to the other wireless endpoint.

17. A wireless endpoint comprising:

a receiver for receiving a data request, from another wireless endpoint, for a data session, the data request having an associated data rate;

a processor for (a) selecting either a shared set of codes or a permanent set of codes as a function of the associated data rate, (b) selecting a code from the selected set for use by the other wireless endpoint, wherein, if the code is selected from the permanent set, the code is assigned to the other wireless endpoint for the duration of the data session, and if the code is selected from the shared set, the code is assigned to the other wireless endpoint for a period of time less than the duration of the data session, and (c) the processor re-partitions the code-tree as a function of traffic.

18. The wireless endpoint of claim 17 wherein the code tree represents a number of channelization codes.

19. The wireless endpoint of claim 18 wherein the channelization codes are orthogonal variable spreading factor codes.

20. The wireless endpoint of claim 17 wherein a code selected from the shared set is assigned on the frame-by-frame basis using a downlink shared channel (DSCH).

21. The wireless endpoint of claim 17, wherein the processor selects the permanent set if the associated data rate is less than a threshold; and selects the shared set otherwise.

22. A method for use in a first wireless endpoint, the method comprising the steps of:

partitioning a code-tree into a permanent set and a shared set;

communicating with a second wireless endpoint by selecting the permanent set when the second wireless endpoint requests a data rate below a threshold and then selecting a code, from the permanent set, for use in transporting data to the second wireless endpoint; and otherwise, selecting the shared set.

23. A method for use in a first wireless endpoint, the method comprising the steps of:

receiving a data request, from a second wireless endpoint, for a data session, the data request having an associated data rate;

selecting either a shared set of codes or a permanent set of codes as a function of the associated data rate, wherein the permanent set is selected if the associated data rate is less than a threshold; and the shared set is selected otherwise; and selecting a code from the selected set for use by the second wireless endpoint, wherein, if the code is selected from the permanent set, the code is assigned to the second wireless endpoint for the duration of the data session, and if the code is selected from the shared set, the code is assigned to the second wireless endpoint for a period of time less than the duration of the data session.

24. A wireless endpoint comprising:

a receiver for receiving a data request, from another wireless endpoint, for a data session, the data request having an associated data rate;

a processor for (a) selecting either a shared set of codes or a permanent set of codes as a function of the associated data rate, wherein the processor selects the permanent set if the associated data rate is less than a threshold, and selects the shared set otherwise; and (b) selecting a code from the selected set for use by the other wireless endpoint, wherein, if the code is selected from the permanent set, the code is assigned to the other wireless endpoint for the duration of the data session, and if the code is selected from the shared set, the code is assigned to the other wireless endpoint for a period of time less than the duration of the data session.

* * * * *